Nov. 22, 1927.  
H. E. PLUNKETT  
1,650,233  
CONNECTER FOR ELECTRIC CONDUITS  
Original Filed Jan. 8, 1921   2 Sheets-Sheet 1
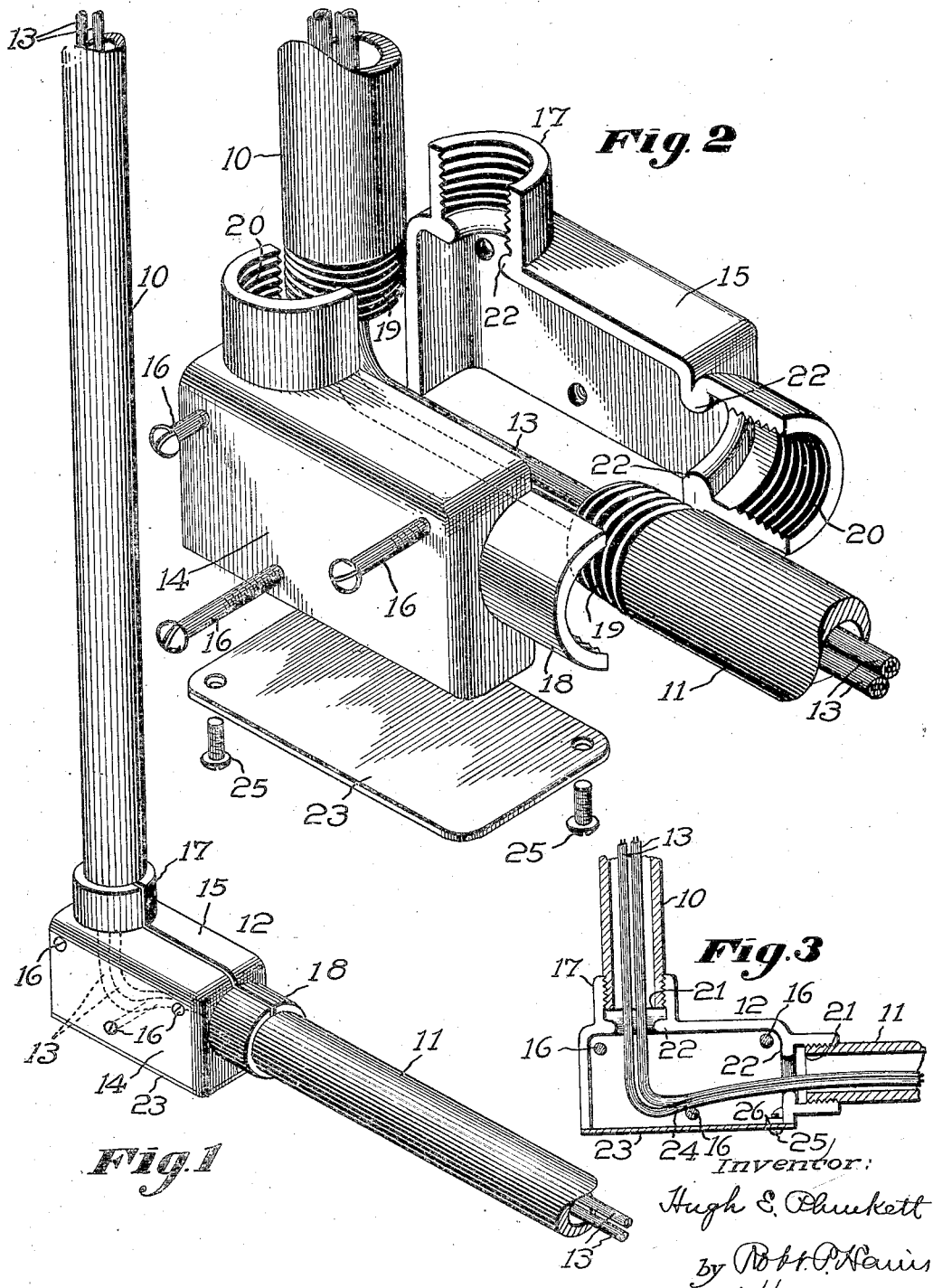

Nov. 22, 1927. 1,650,233
H. E. PLUNKETT
CONNECTER FOR ELECTRIC CONDUITS
Original Filed Jan. 8, 1921 2 Sheets-Sheet 2

Inventor:
Hugh E. Plunkett
by Robt P. Harris
Attorney

Patented Nov. 22, 1927.

1,650,233

UNITED STATES PATENT OFFICE.

HUGH E. PLUNKETT, OF HUDSON, NEW HAMPSHIRE.

CONNECTER FOR ELECTRIC CONDUITS.

Application filed January 8, 1921, Serial No. 435,930. Renewed August 13, 1923.

This invention relates to conduits for electric conductors and more particularly to connecters for connecting the ends of conduits when they change direction.

It is now customary to encase electric conductors in pipes or other armor when installed in buildings to overcome the danger from fire and for other purposes. When a pipe is used as the conduit the insulated conductors may be readily pushed or pulled through the pipe, provided it is relatively straight and is free from sharp bends or elbows. If, however, it is necessary to insert conductors through connected pipes extending at angles to each other, difficulty is experienced in forcing the conductors through the elbow or other connection between the pipes, and if the insulated wire is permitted to drag over an end of one of the pipes as it is pulled from one pipe to the other, the insulation is likely to be damaged.

Various types of connecters or elbows for conduits have been heretofore proposed which are designed to permit access to the conductors at the point where the bend occurs in order that the conductors may be drawn through one pipe or conduit and then drawn through the other, and it is to connecters of this general type that the present invention relates.

An important feature of the present invention consists in providing a box-like connecter for conduits which is so constructed that it may be readily applied to the conduits to connect them either before or after they have been secured in place in a building or other structure. In accordance with the present invention, the conductors may be passed freely through one pipe without being obstructed by an elbow or other connection upon the pipe, and then may be passed freeely through the second pipe extending at an angle to the first, or the conductors may be passed through both pipes before they are secured in place. After the conduits are installed with the conductors extending therethrough, the connecter may be applied to the adjacent ends of the metal conduits.

Another feature of the invention consists in providing the box-like connecter with inwardly extending flanges constructed to hold the conductors out of contact with the more or less sharp edges at the ends of the conduits.

Still another feature of the invention consists in providing the box-like connecter with an opening, or door, in a side wall thereof to permit access to the conductors after the connecter is secured in place.

The above and other features of the invention will be clear from the following description when read in connection with the accompanying drawings.

In the drawings:—

Figure 1 is a perspective view of a pair of conduits extending at an angle to each other, and secured together by a connecter constructed in accordance with the present invention.

Fig. 2 is an enlarged perspective view showing the parts of Fig. 1 disassembled.

Fig. 3 is a longitudinal, vertical section of Fig. 1.

Figure 4:
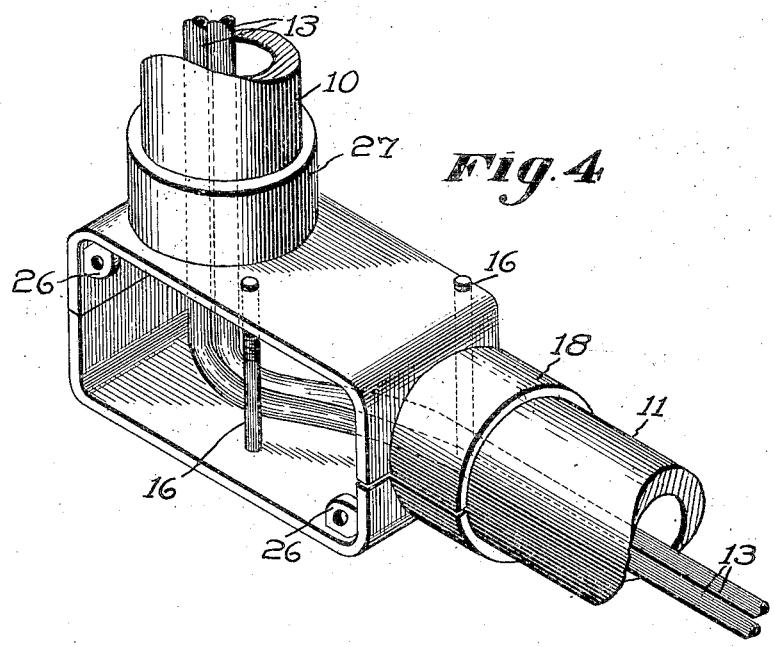
Fig. 4 is a perspective view showing a different embodiment of the invention.

In the drawings, 10 designates one pipe or conduit and 11 a second pipe or conduit extending at substantially right angles to the first. The conduits 10 and 11 are secured together by a connecter 12, and two insulated conductors 13 are shown extending through the connected conduits.

Figure 5:
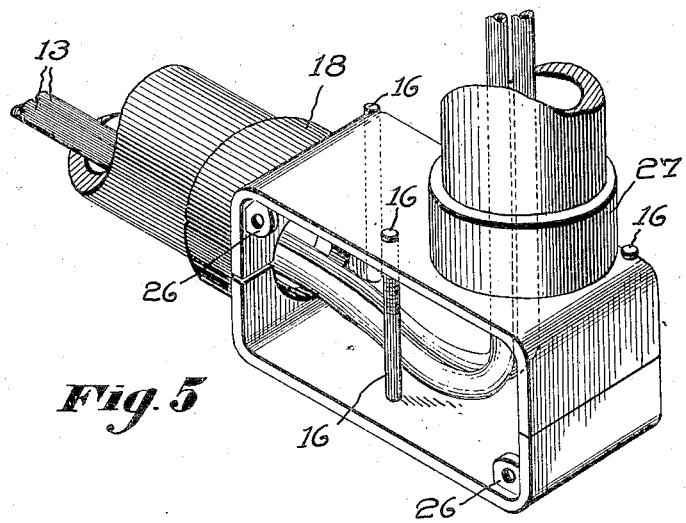
Fig. 5 is a perspective view showing a modification of Fig. 4.

The connecter 12 in the embodiment shown comprises a hollow box split longitudinally midway between the lateral walls to form the box sections 14 and 15, and the sections are secured together by bolts 16 extending through a side wall of one section and having threaded engagement with the opposite wall of the other section. The conduits illustrated extend at substantially right angles to each other and the conduit 10 is connected to a side wall of the box-like connecter 12 by a socket 17 while the conduit 11 is connected to an end wall by the socket 18, the sockets, however, may extend from different walls of the connecter as shown in Figs. 1, 4 and 5.

In the embodiment shown in Figs. 1, 2 and 3, each of the sockets 17 and 18 is divided centrally by the split dividing the box into sections 14 and 15, and as a result of this construction, the halves of each socket may be moved away from each other upon removing the bolts 16. Various means may be provided for securing the ends of the conduits 10 and 11 within the sockets 17 and 18, and in the embodiment shown, the conduits are threaded as at 19 to engage corresponding threads 20 within the sockets.

Metal conduits usually have relatively sharp edges or corners as indicated by 21 and it is desirable to keep the insulated conductors 13 from coming in contact with, and becoming damaged by the edges 21. To this end, the sockets 17 and 18 have formed therein the inwardly directed, annular flanges 22 constructed to present a smooth rounded surface to the conductors, and the flanges 22 extend inwardly a sufficient distance to hold the conductors 13 out of engagement with the adjacent edges 21, as will be apparent from Fig. 3.

The connecter 12 preferably has one side wall open to permit access to the interior of the connecter when the portions 14 and 15 are secured together, and this opening is preferably provided with a removable cover 23. In the embodiment shown in Figs. 1, 2 and 3 the opening lies opposite the vertical conduit 10, and when the parts are in this position, the conductors 13 tend to move downwardly, due to gravity, into engagement with the cover 23, this may be prevented however, by positioning one of the bolts 16 below the conductors and in position to serve as a pin for supporting the conductors as at 24 (Fig. 3). The cover plate 23 may be secured in place by screws 25 engaging lugs 26 within the connecter.

From the foregoing it will be clear that the conductors 13 may be readily inserted within the conduits 10 and 11 either before or after they are secured at substantially right angles to each other upon a building, or other structure, and after the conductors are installed the box portions 14 and 15 may be placed upon opposite sides of the conduits and secured together as shown in Fig. 1 to form a tight fireproof connection between the adjacent ends of the conduits.

When the connecter 12 is placed in the corner of a building, it is usually desirable to have the open side thereof, face outwardly irrespectively of the direction in which the conduits 10 and 11 extend. This requires that the location of the open wall, and the position of one of the sockets upon the box be changed to meet the different conditions under which the connecter 12 may be used. Accordingly, in Fig. 4, a modification is shown in which the split dividing the box into two sections does not pass through the lateral socket 27, but passes through the open wall and the wall lying opposite. In other respects, the construction of Fig. 4 may be similar to that shown in Figs. 1, 2 and 3, and one of the bolts 16 constitutes a pin that prevents the conductors from contacting with the removable cover plate.

The construction of Fig. 5 differs from Fig. 4 in that in Fig. 5, the socket 27 is positioned upon a wall opposite to the wall upon which it is positioned in Fig. 4, the construction shown in one of these modifications may be regarded as a right hand connecter while the other may be regarded as a left hand connecter.

Since the socket 27 is not split, the section to which it is secured should be secured to its conduit before the conductors are passed through the same, but it is unnecessary to secure this section to the other conduit until the conductors have been installed. It will therefore be apparent that the connecters disclosed in Figs. 4 and 5 permit substantially the same amount of freedom in installing the conductors that is afforded by the connecter of Figs. 1, 2 and 3.

Claims.

1. A connecter for connecting angularly disposed metal conduits, comprising a hollow substantially rectangular metal box split longitudinally between its lateral walls to form two separate box sections, conduit receiving sockets extending from an end and a side wall of the box, each socket having the split of the box extending longitudinally therethrough so that the box sections may be removed without disturbing the conduits connected by the box, said box having an opening through a wall thereof, a cover plate for said opening, bolts extending through the box to secure the box sections together, and one of the bolts disposed to support conductors within the box out of contact with the cover plate.

2. A connecter for connecting angularly disposed metal conduits having threaded ends, comprising a hollow elongated metal box split longitudinally between its lateral walls to form two separate box sections, a conduit receiving socket extending from an end wall of the box and threaded to engage the threads upon one of said conduits, a conduit receiving socket extending from a side wall of the box and threaded to engage the threads upon another conduit, at least one of the sockets having the split of the box extending longitudinally therethrough that one section may be removed without disturbing the conduits connected by the box, a cover plate removably secured to one of the box sections, a pin extending through the box adjacent the cover plate and acting to prevent the bent portion of the wire within the box from bulging out of the box when the cover plate is removed, and bolts for securing the box sections together.

3. A connecter for connecting angularly disposed metal conduits, comprising a hollow metal box split longitudinally between its lateral walls to form two separate box sections, a conduit receiving socket extending from an end wall of the box and having the split of the box extending longitudinally through the socket that the split portions of the socket may be moved laterally into gripping engagement with an end of one of the metal conduits, a conduit receiving socket extending from a side wall of the box and adapted to receive an end of another metal conduit, said box having an opening through a side wall thereof, a cover plate for said opening, bolts extending through the box to secure the box sections together, and one of the bolts disposed to hold conductors within the box out of contact with the cover plate.

In testimony whereof, I have signed my name to this specification.

HUGH E. PLUNKETT.